US012602087B2

(12) United States Patent
Deng

(10) Patent No.: US 12,602,087 B2
(45) Date of Patent: Apr. 14, 2026

(54) WATERPROOF PROTECTIVE CASE OF MOBILE TERMINAL FOR DIVING

(71) Applicant: SHENZHEN YISE TECHNOLOGY CO., LTD, Shenzhen (CN)

(72) Inventor: Li Xin Deng, Shenzhen (CN)

(73) Assignee: SHENZHEN YISE TECHNOLOGY CO., LTD, Shenzhen (CN)

( * ) Notice: Subject to any disclaimer, the term of this patent is extended or adjusted under 35 U.S.C. 154(b) by 116 days.

(21) Appl. No.: 18/614,899

(22) Filed: Mar. 25, 2024

(65) Prior Publication Data

US 2025/0244798 A1     Jul. 31, 2025

(30) Foreign Application Priority Data

Jan. 25, 2024     (CN) .......................... 202410105572.X

(51) Int. Cl.
*G06F 1/16* (2006.01)

(52) U.S. Cl.
CPC .......... *G06F 1/1656* (2013.01); *G06F 1/1675* (2013.01); *G06F 2200/1636* (2013.01)

(58) Field of Classification Search
CPC ................. G06F 1/1656; G06F 1/1675; G06F 2200/1636
See application file for complete search history.

(56) References Cited

U.S. PATENT DOCUMENTS 5,907,721 A * 5/1999 Schelling ............... G03B 17/08
                                                                    396/27
8,453,835 B2 * 6/2013 So .......................... A45C 11/22
                                                                    206/811

| | | | |
|---|---|---|---|
| 9,731,886 B2 * | 8/2017 | Chang ................... | H04B 1/3888 |
| 10,761,628 B2 * | 9/2020 | Liu ......................... | G06F 1/1613 |
| 12,370,456 B1 * | 7/2025 | Patel ....................... | A63F 13/98 |
| 2012/0262618 A1 * | 10/2012 | Weakly ................. | G06F 1/1632 |
| | | | 348/E5.022 |
| 2015/0217843 A1 * | 8/2015 | Leinikki ................. | B63C 11/02 |
| | | | 345/174 |
| 2015/0281416 A1 * | 10/2015 | Sailer ...................... | G06F 1/182 |
| | | | 455/566 |
| 2016/0269517 A1 * | 9/2016 | Alexander .............. | H04M 1/18 |
| 2019/0013832 A1 * | 1/2019 | Mody ................. | H04M 1/0202 |
| 2019/0129529 A1 * | 5/2019 | Liu ......................... | G06F 1/182 |
| 2019/0239375 A1 * | 8/2019 | Lu ..................... | G02F 1/133308 |
| 2021/0028806 A1 * | 1/2021 | Tsoi ................ | H04M 1/724092 |
| 2025/0076935 A1 * | 3/2025 | Waller .................. | G06F 3/0412 |

* cited by examiner

*Primary Examiner* — Anthony Q Edwards
(74) *Attorney, Agent, or Firm* — HOWARD M COHN and Associates, LLC

(57) ABSTRACT

A waterproof protective case of a mobile terminal for diving includes a housing and a touch portion. The housing defines an accommodating cavity therein. A fixing opening is defined on the accommodating cavity. The touch portion is disposed on the fixing opening. The touch portion includes a flexible bag and a transparent medium liquid. A liquid carrying cavity configured to store the transparent medium liquid is defined in the flexible bag. A first surface of the flexible bag faces an outside. A second surface of the flexible bag faces the accommodating cavity. When the mobile terminal is accommodated in the accommodating cavity, under action of the transparent medium liquid, the flexible bag abuts against a display screen of the mobile terminal thereby enabling a user to control the display screen through the flexible bag.

15 Claims, 16 Drawing Sheets

A-A

B-B

WATERPROOF PROTECTIVE CASE OF MOBILE TERMINAL FOR DIVING

TECHNICAL FIELD

The present disclosure relates to a technical field of waterproof cases, and in particular to a waterproof protective case of a mobile terminal for diving.

BACKGROUND

Mobile terminals comprise electronic devices such as mobile phones, tablets, cameras, etc. Although the mobile terminals on the market have certain waterproof functions, if they are immersed in water for too long, water may still enter therein. Therefore, waterproof cases are created. Conventional waterproof cases generally comprise a transparent plate and buttons. When a mobile terminal is placed in a conventional waterproof case, a display screen of the mobile terminal is displayed through the transparent plate. A user is allowed to control the mobile terminal to shoot in the water by controlling the buttons.

However, affected by water pressure, a gap is defined between the display screen of the mobile terminal and the transparent plate of the conventional waterproof case, causing disconnection. Therefore, none of the conventional waterproof cases on the market has an underwater touch screen function, making it difficult for the user to fully use various functions of the mobile terminal underwater, which is not conducive to user operation.

SUMMARY

The present disclosure provides a waterproof protective case of a mobile terminal for diving that has an underwater touch screen function.

To realize the above purpose, the present disclosure provides the waterproof protective case including a housing and a touch portion.

The housing defines an accommodating cavity therein. The accommodating cavity is configured to accommodate the mobile terminal. A fixing opening is defined on a first sidewall of the accommodating cavity. The fixing opening is configured to communicate with an outside. The touch portion is disposed on the fixing opening. The touch portion comprises a flexible bag and a transparent medium liquid. A liquid carrying cavity configured to store the transparent medium liquid is defined in the flexible bag. A first surface of the flexible bag faces the outside. A second surface of the flexible bag faces the accommodating cavity. When the mobile terminal is accommodated in the accommodating cavity, a display screen of the mobile terminal abuts against the second surface of the flexible bag. Since the flexible bag has a certain degree of ductility, the flexible bag is deformed when a finger of a user slides thereon, making the transparent medium liquid in the liquid carrying cavity to flow and contact touch points of the display screen. That is, the flexible bags and the transparent medium liquid are cooperated to simulate finger movements to touch the touch points of the display screen, thereby effectively eliminating influence of water pressure and enabling the user to control the display screen by touching. Thus, it is easy for the user to fully use the mobile terminal underwater.

Optionally, the housing further comprises a pressing frame, and the pressing frame is fixed to the housing through glue or screws so as to press the flexible bag at the fixing opening. By such design, early-stage assembly, later replacement, and maintenance of the flexible bag are facilitated, and disassembly and assembly convenience is improved.

Optionally, the flexible bag comprises a top film layer and a bottom film layer. Edges of the top film layer are connected with edges of the bottom film layer, and the top film layer and the bottom film layer are enclosed to form the liquid carrying cavity. The top film layer faces the outside, and the bottom film layer abuts against the display screen of the mobile terminal.

Optionally, the top film layer is made of a thermoplastic polyurethanes (TPU) material or a polyvinyl chloride (PVC) material, and the bottom film layer is made of a Polycarbonate (PC) material or a polyethyleneterephthalate (PET) material, so that the flexible bag has good ductility and adaptability. The transparent medium liquid is dimethyl silicone oil, polyethylene glycol, or transparent butter, so that the transparent medium liquid has good light transmittance. Moreover, a density of the transparent medium liquid is similar to a density of the finger, enabling the flexible bag to well contact the display screen.

Optionally, a liquid supply end socket is disposed on the housing. A liquid filling inlet communicated with the liquid carrying cavity is defined on the flexible bag. The liquid supply end socket is communicated with the liquid filling inlet.

Optionally, a venting end socket is disposed on the housing. An air vent communicated with the liquid carrying cavity is defined on the flexible bag. The venting end socket is communicated with the air vent.

Optionally, the waterproof protective case further comprises two plugs. The two plugs are respectively detachably mounted on the liquid supply end socket and the venting end socket to seal or open the liquid supply end socket and the venting end socket.

Optionally, the two plugs comprise studs. Screw holes are respectively defined on the liquid supply end socket and the venting end socket. Each of the studs is screwed with a corresponding screw hole, so as to seal or open the liquid supply end socket and the venting end socket conveniently.

Optionally, a transparent plate is mounted on the housing. A position of the transparent plate corresponds to a camera of the mobile terminal.

Optionally, an abutting frame is disposed on the housing. A mounting opening is defined on a second sidewall of the accommodating cavity. The abutting frame is fixed to the housing through the glue or the screws to abut the transparent plate against the mounting opening.

Optionally, a sealing strip is disposed at a connecting position of the abutting frame and the housing. The sealing strip ensures a tight mounting of the abutting frame, thereby ensuring sealing performance of the accommodating cavity.

Optionally, a connecting base is disposed on the housing, and the connecting base comprises a connecting hole configured to connect with a universal tripod.

Optionally, the housing further comprises a hanging seat, and the hanging seat defines a hanging hole configured to connect with a hanging strap, so as to improve inletability of the water protective case.

Optionally, the waterproof protective case further comprises a flip cover. The housing further defines a accommodating opening communicated with the accommodating cavity. The flip cover is rotatably connected with the housing to cover or open the accommodating opening. The mobile terminal is allowed to be accommodated in or taken out of the accommodating cavity through the accommodating opening.

Optionally, the waterproof protective case further comprises locking pieces. clamping holes are defined on the accommodating opening of the housing. A sliding groove is defined in the flip cover. Each of the locking pieces comprises a clamping block. Each clamping block is slidably mounted in the sliding groove and is slidable in and out of the sliding groove. When the flip cover is rotated to cover the accommodating opening, each clamping block slides out of the sliding groove and is clamped in a corresponding clamping hole to lock the flip cover.

Optionally, each of the locking pieces 5 comprises a shifting block. The flip cover defines a limiting opening communicated with the sliding groove. Each shifting block is movably disposed at the limiting opening and is connected with a corresponding clamping block. Each shifting block is movable along the limiting opening to drive the corresponding clamping block to slide into or out the sliding groove.

Optionally, a limiting bar is disposed on the flip cover. A limiting groove is define on the accommodating opening of the housing. The limiting bar is clamped in the limiting groove, so that the sealing performance of the flip cover and the housing is improved.

Optionally, anti-slip lines are define on the housing, the flip cover, and each shifting block, so that the user is allowed to hold the waterproof protective case and move each shifting block conveniently.

Optionally, the waterproof protective case further comprises a holder. The flip cover further comprises a pressing block. The holder is configured to hold the mobile terminal. The holder is placeable in the accommodating cavity through the accommodating opening. When the flip cover is rotated to close the accommodating opening, the pressing block abuts against the holder accommodated in the accommodating cavity.

Optionally, suction cups configured to suck the mobile terminal are disposed on the holder, which improves stability of the mobile terminal accommodated in the accommodating cavity.

In the waterproof protective case of the present disclosure, the accommodating cavity configured to accommodate the mobile terminal is defined in the housing, and the touch portion configured to block the accommodating cavity is disposed on the fixing opening, so that the housing is completely closed and has a waterproof function.

The liquid carrying cavity configured to store the transparent medium liquid is defined in the flexible bag. Under an action of the transparent medium liquid and an action of a deformation ability of the flexible bag, the housing not only has a display function, but also eliminates the influence of water pressure and ensure that the flexible bag closely fits the display screen. Therefore, no gap is formed between the touch portion and the display screen to cause disconnection, enabling the housing to have the underwater touch screen function, which improves operational convenience.

BRIEF DESCRIPTION OF DRAWINGS

The accompanying drawings are used to provide a further understanding of the present disclosure and constitute a part of the specification. The accompanying drawings are used to explain the present disclosure together with the disclosed embodiments and do not constitute a limitation of the present disclosure.

In the drawings.

Figure 1:
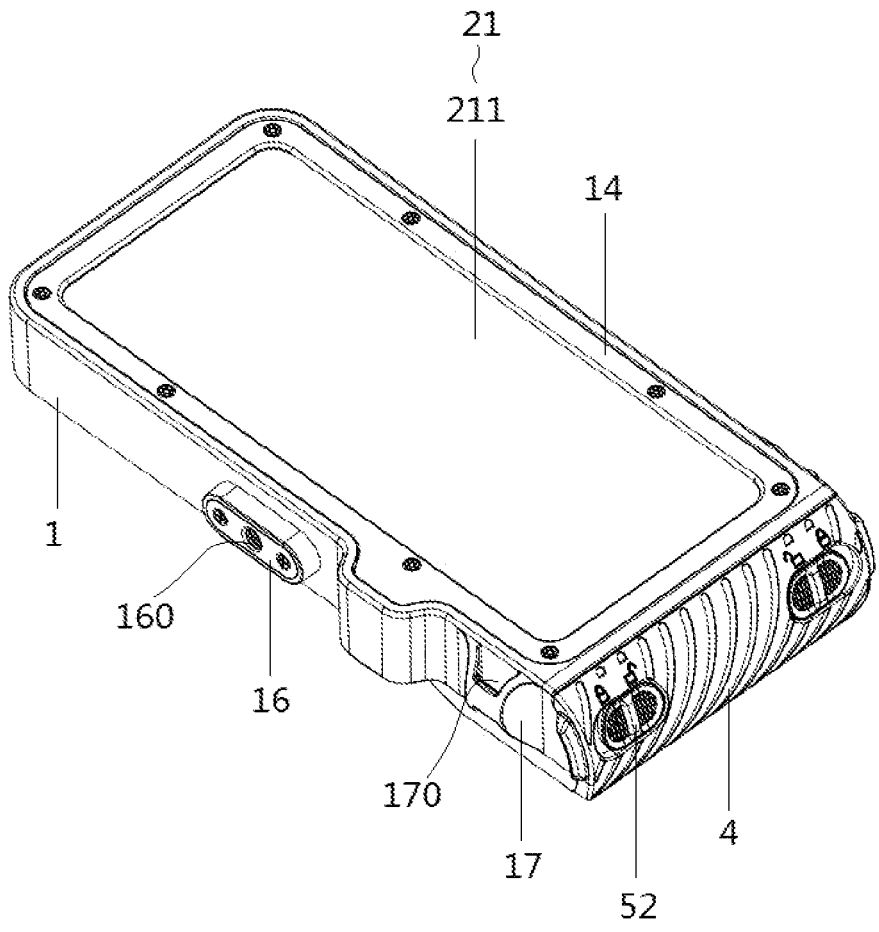
FIG. 1 is a schematic diagram of a waterproof protective case of the present disclosure.
Figure 2:
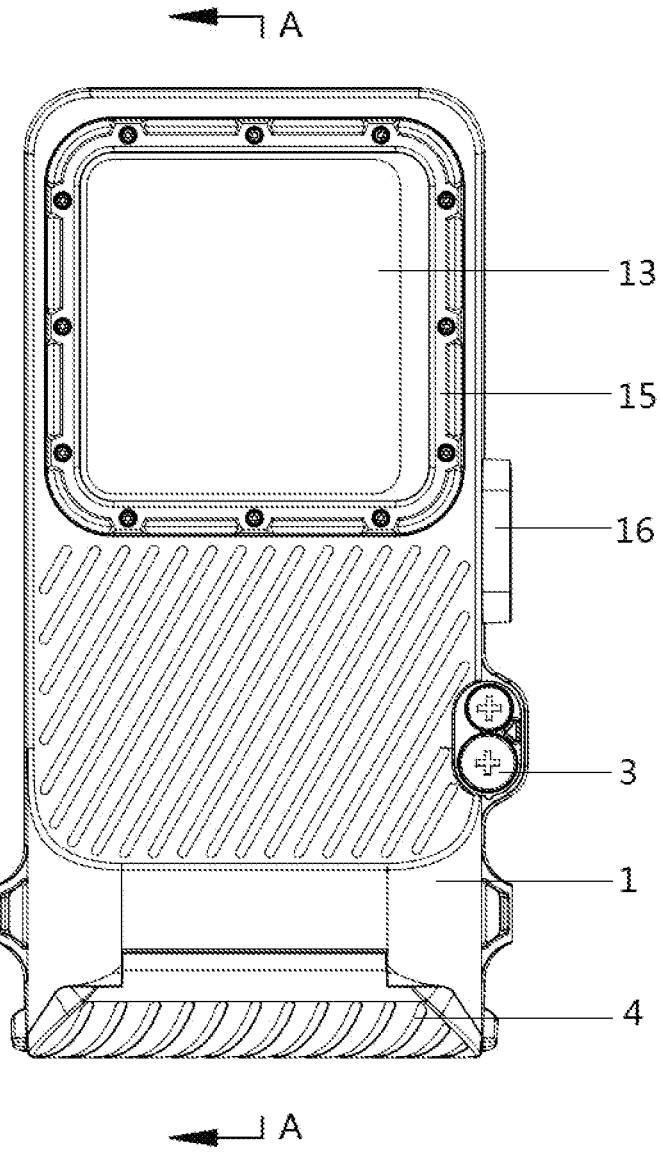
FIG. 2 is a front schematic diagram of the waterproof protective case shown in FIG. 1.

1—housing; 10—accommodating cavity; 101—fixing opening; 102—accommodating opening; 103—clamping hole; 104—limiting groove; 105—mounting opening; 11—liquid supply end socket; 110—screw hole; 12—venting end socket; 13—transparent plate; 14—pressing frame; 15—abutting frame; 150—sealing strip; 16—connecting base; 160—connecting hole; 17—hanging seat; 170—hanging hole; 2—touch portion; 21—flexible bag; 210—liquid carrying cavity; 2101—liquid filling inlet; 2102 air vent; 211—top film layer; 212—bottom film layer; 22—transparent medium liquid; 3—plug; 30—stud; 4—flip cover; 41—sliding groove; 42 limiting opening; 43—pressing block; 44—limiting bar; 5—locking piece; 51 clamping block; 52—shifting block; 6—holder; 60—suction cup.

DETAILED DESCRIPTION

Technical solutions in the embodiments of the present disclosure are clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

As shown in FIGS. 1-6, the present disclosure provides a waterproof protective case of a mobile terminal for diving. The waterproof protective case comprises a housing 1 and a touch portion 2.

The housing 1 defines an accommodating cavity 10 therein. The accommodating cavity 10 is configured to accommodate the mobile terminal. A fixing opening 101 is defined on a first sidewall of the accommodating cavity 10. The fixing opening 101 is configured to communicate with an outside. The touch portion 2 is disposed on the fixing opening 101. The touch portion 2 comprises a flexible bag 21 and a transparent medium liquid 22. A liquid carrying cavity 210 configured to store the transparent medium liquid 22 is defined in the flexible bag 21. A first surface of the flexible bag 21 faces the outside. A second surface of the flexible bag 21 abuts against a display screen of the mobile terminal.

Specifically, when in use, the mobile terminal is accommodated in the accommodating cavity 10, and the display screen of the mobile terminal abuts against the second surface of the flexible bag 21. Since the flexible bag 21 has a certain degree of ductility, the flexible bag 21 is deformed when a finger of a user slides thereon, making the transparent medium liquid 22 in the liquid carrying cavity 210 to flow and contact touch points of the display screen. That is, the flexible bag 21s and the transparent medium liquid 22 are cooperated to simulate finger movements to touch the touch points of the display screen, thereby effectively eliminating influence of water pressure and enabling the user to control the display screen by touching. Thus, it is easy for the user to fully use the mobile terminal underwater.

In the waterproof protective case of the present disclosure, the accommodating cavity 10 configured to accommodate the mobile terminal is defined in the housing 1, and the touch portion 2 configured to block the accommodating cavity 10 is disposed on the fixing opening 101, so that the housing 1 is completely closed and has a waterproof function. The liquid carrying cavity 210 configured to store the transparent medium liquid 22 is defined in the flexible bag 21. Under an action of the transparent medium liquid 22 and an action of a deformation ability of the flexible bag 21, the housing 1 not only has a display function, but also eliminates the influence of water pressure and ensure that the flexible bag 21 closely fits the display screen. Therefore, no gap is formed between the touch portion 2 and the display screen to cause disconnection, enabling the housing 1 to have the underwater touch screen function, which improves operational convenience.

As shown in FIGS. 1-5, the housing further comprises a pressing frame 14, and the pressing frame 14 is fixed to the housing 1 through glue or screws so as to press the flexible bag 21 at the fixing opening 101. By such design, early-stage assembly, later replacement, and maintenance of the flexible bag 21 are facilitated, and disassembly and assembly convenience is improved.

Figure 3:
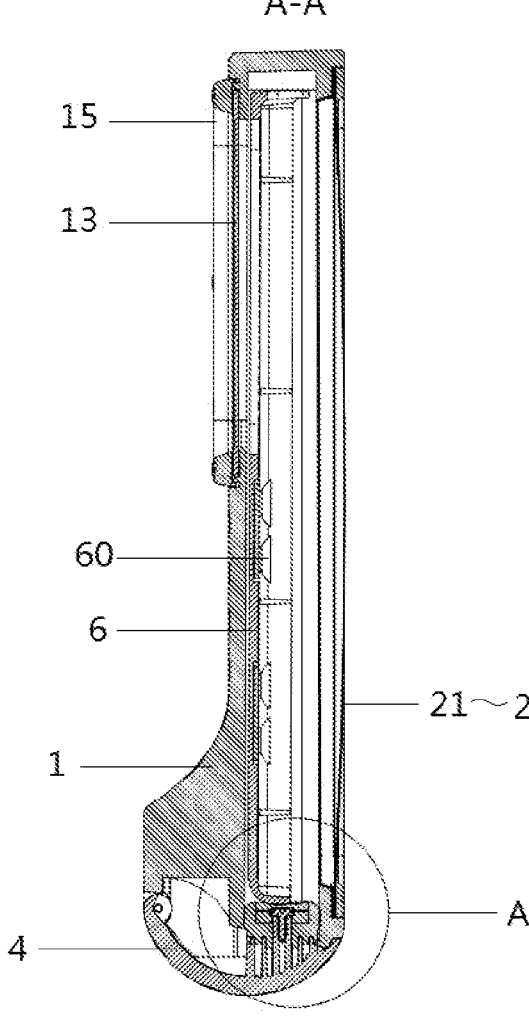
FIG. 3 is a cross-sectional schematic diagram of the waterproof protective case taken along a line A-A shown in FIG. 2.
Figure 4:
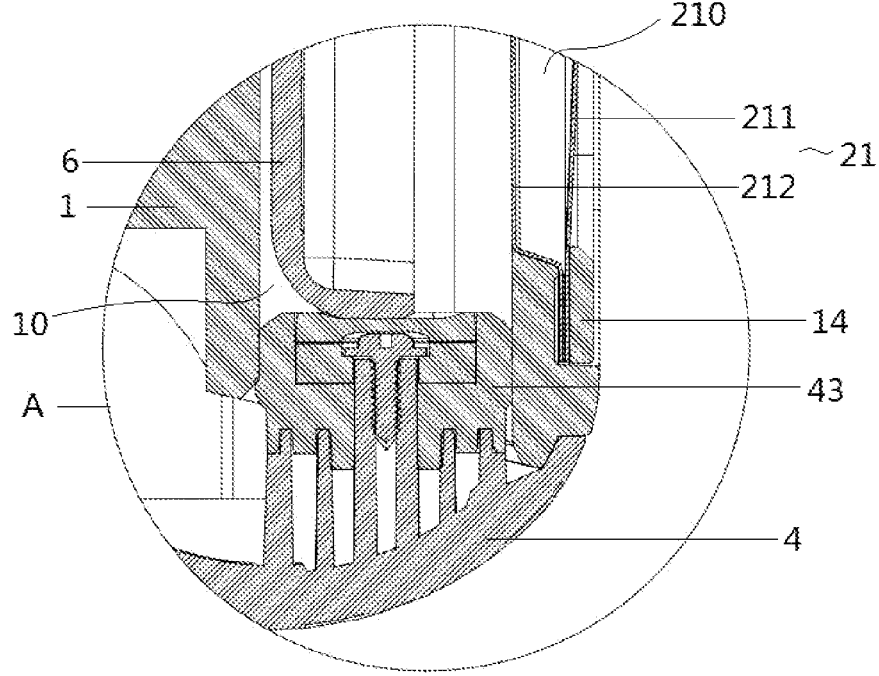
FIG. 4 is an enlarged schematic diagram of portion A shown in FIG. 3.
Figure 16:
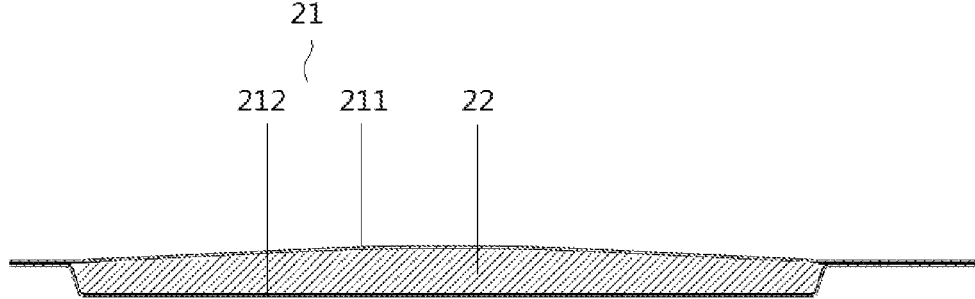
FIG. 16 is a cross-sectional schematic diagram of the flexible bag of the present disclosure.

As shown in FIGS. 3, 4, and 16, the flexible bag 21 comprises a top film layer 211 and a bottom film layer 212. Edges of the top film layer 211 are connected with edges of the bottom film layer 212, and the top film layer 211 and the bottom film layer 212 are enclosed to form the liquid carrying cavity 210. The top film layer 211 faces the outside, and the bottom film layer 212 abuts against the display screen of the mobile terminal.

Specifically, when the finger of the user slides on the top film layer 211, the top film layer 211 deforms and drives transparent medium liquid 22 to flow. The transparent medium liquid 22 flows to drive the bottom film layer 212 to deform, so that the bottom film layer 212 deforms and closely fits the display screen. When the finger moves to a specific position, the top film layer 211 and the bottom film layer 212 undergo adaptive deformation under the action of the transparent medium liquid 22 to simulate the movements of the finger to touch the display screen, which finally enables the user to control the display screen.

It should be noted that the flexible bag 21 may be integrally formed or assembled. In the embodiment, the edges of the top film layer 211 and the edges of the bottom film layer 212 are bonded through the glue or are sewn through silk threads to form the flexible bag. 21. Such arrangements facilitate processing and production.

As shown in FIGS. 3, 4, and 16, the top film layer 211 is made of a thermoplastic polyurethanes (TPU) material or a polyvinyl chloride (PVC) material, and the bottom film layer 212 is made of a Polycarbonate (PC) material or a polyethyleneterephthalate (PET) material, so that the flexible bag 21 has good ductility and adaptability. The transparent medium liquid 22 is dimethyl silicone oil, polyethylene glycol, or transparent butter, so that the transparent medium liquid 22 has good light transmittance. Moreover, a density of the transparent medium liquid 22 is similar to a density of the finger, enabling the flexible bag 21 to well contact the display screen.

It should be noted that in addition to above materials, the top film layer 211 and the bottom film layer 212 may be made of other flexible materials, and the transparent medium liquid 22 may also be other light-transmitting liquids. Since there are various types of flexible materials and liquids, the material of the flexible bag is not limited thereto.

Figure 5:
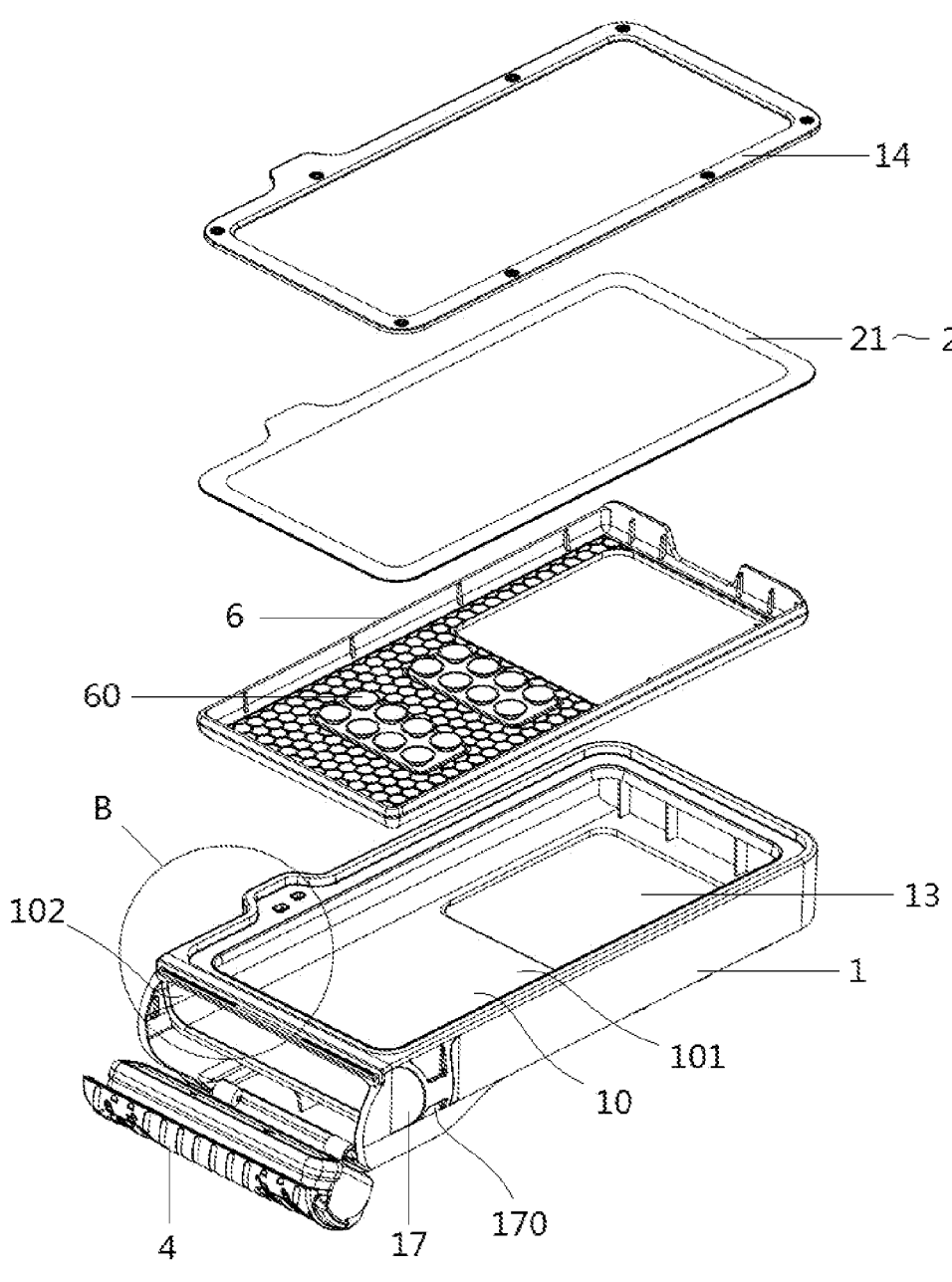
FIG. 5 is an exploded schematic diagram of the waterproof protective case of the present disclosure.
Figure 6:
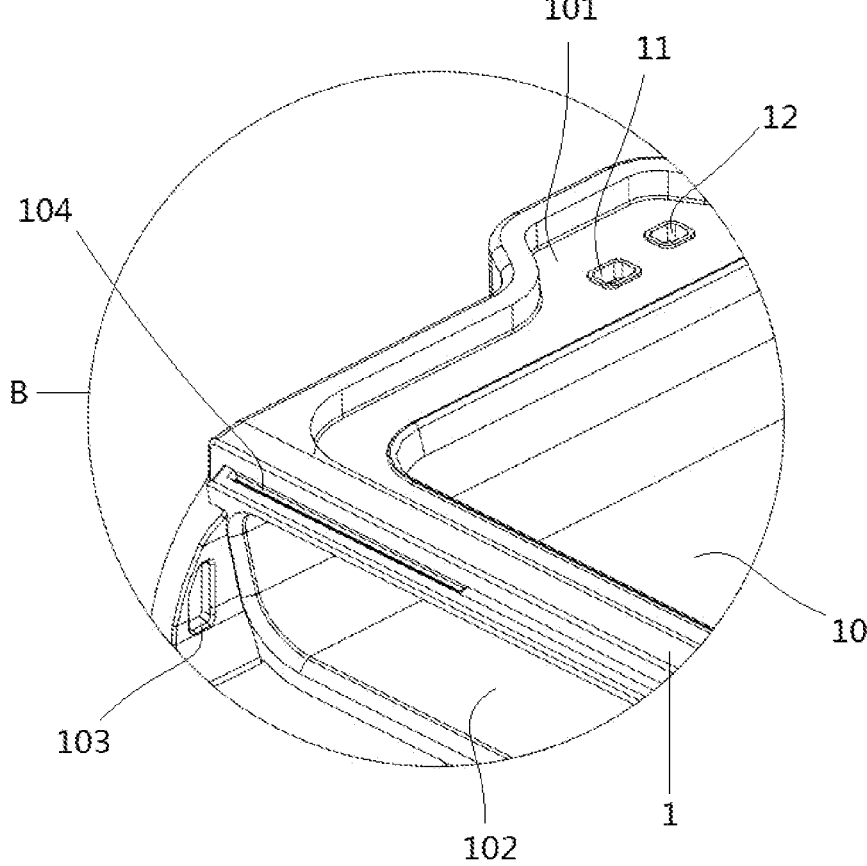
FIG. 6 is an enlarged schematic diagram of portion B shown in FIG. 5.
Figure 7:
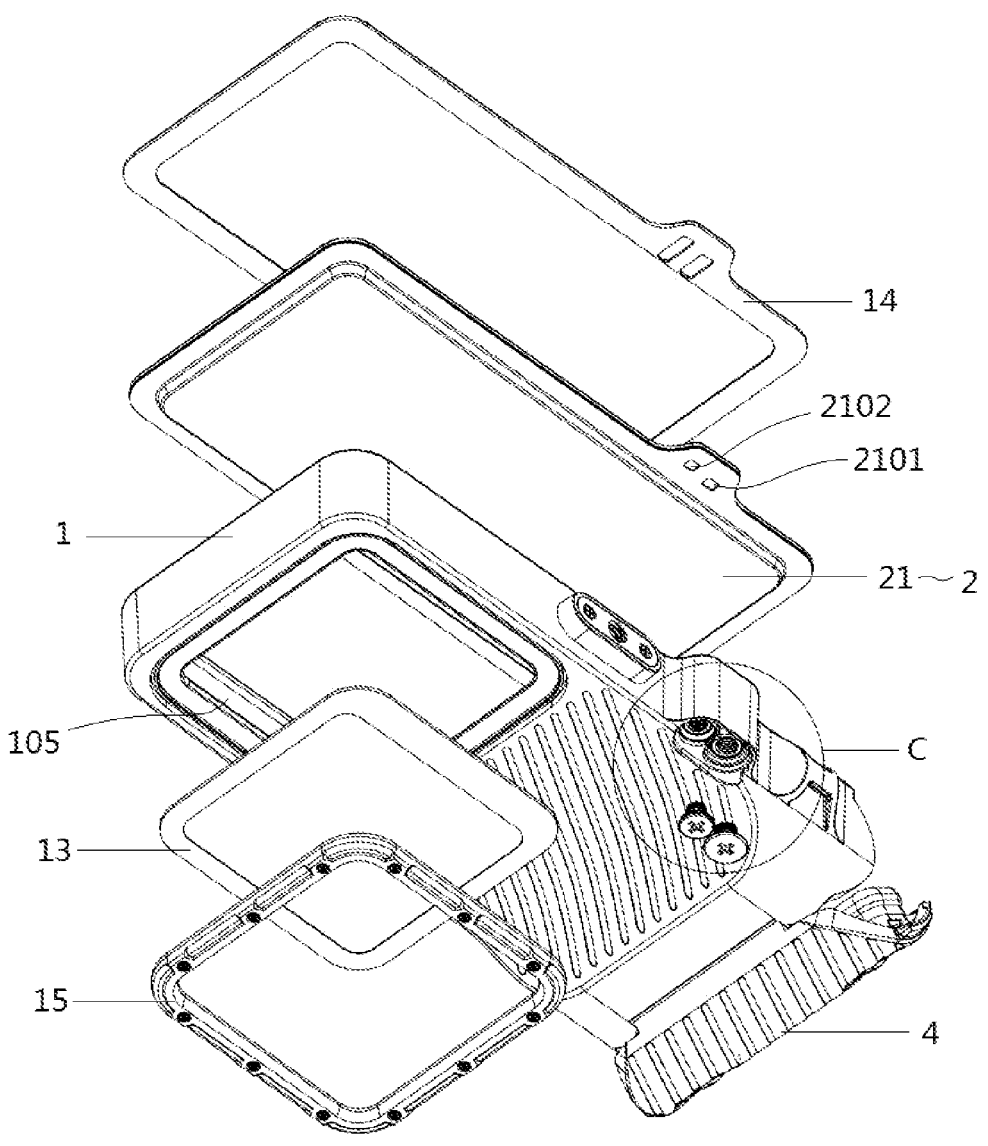
FIG. 7 is another exploded schematic diagram of the waterproof protective case of the present disclosure.

As shown in FIGS. 5-7, the transparent medium liquid 22 may be directly injected into the liquid carrying cavity 210 of the flexible bag 21 during production, but this method is troublesome, and the flexible bag 2 filled with the transparent medium liquid 22 is bulging, which is not conducive to mounting the flexible bag 2 tightly to the fixing opening 101. To solve this problem, a liquid supply end socket 11 is disposed on the housing 1. A liquid filling inlet 2101 communicated with the liquid carrying cavity 210 is defined on the flexible bag 21. The liquid supply end socket 11 is communicated with the liquid filling inlet 2101.

Specifically, during assembly, the flexible bag 21 is first mounted on the fixing opening 101, the liquid filling inlet 2101 of the flexible bag 21 is aligned with the liquid supply end socket 11 of the housing 1, and the liquid supply end socket 11 is communicated with an external liquid supply device (not shown in the drawings), so that the transparent medium liquid 22 is injected into the liquid carrying cavity 210 through the liquid supply end socket 11 and the liquid filling inlet 2101. During this process, the flexible bag 2 is bulging and tightly seals the fixing opening 101. By such design, mounting of the flexible bag 21 is facilitated, and the sealing performance of the housing 1 is improved.

As shown in FIGS. 5-7, after the flexible bag 21 is produced, air may exist in the liquid-carrying cavity 210. If the air is not discharged when the transparent medium liquid 22 is injected into the liquid carrying cavity 210, bubbles are generated, causing the touch portion 2 unable to contact the display screen, thus affecting normal use. To solve the problem, in the present disclosure, a venting end socket 12 is disposed on the housing 1. An air vent 2102 communicated with the liquid carrying cavity 210 is defined on the flexible bag 21. The venting end socket 12 is communicated with the air vent 2102.

Specifically, during assembly, the flexible bag 21 is first mounted on the fixing opening 101, the liquid filling inlet 2101 of the flexible bag 21 is aligned with the liquid supply end socket 11 of the housing 1, and the air vent 2102 of the flexible bag 21 is then communicated with the venting end socket 12. When the transparent medium liquid 22 is injected into the liquid carrying cavity 210 through the liquid supply end socket 11 and the liquid filling inlet 2101, the transparent medium liquid 22 extrudes air in the liquid carrying cavity 210, and the air is discharged to the outside through the air vent 2102 and the venting end socket 12, so that the transparent medium liquid 22 is allowed to completely fill the liquid carrying cavity 210, and bubbles are prevented from being generated in the flexible bag 21.

Figure 8:
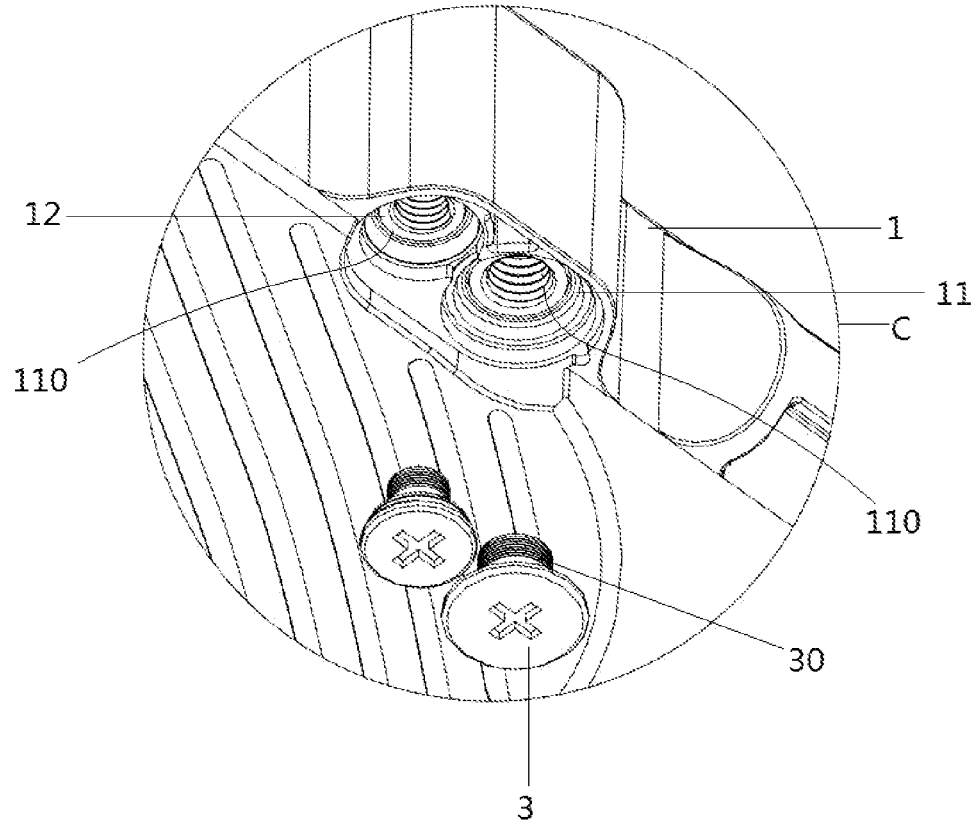
FIG. 8 is an enlarged schematic diagram of portion C shown in FIG. 7.

As shown in FIGS. 7 and 8, to prevent the transparent medium liquid 22 from leaking from the liquid supply end socket 11 and the venting end socket 12 when not in use, the waterproof protective case further comprises two plugs 3. The two plugs 3 are respectively detachably mounted on the liquid supply end socket 11 and the venting end socket 12 to seal or open the liquid supply end socket 11 and the venting end socket 12.

Specifically, when injecting the transparent medium liquid 22 into the flexible bag 21, the plugs 3 disposed on the liquid supply end socket 11 and the venting end socket 12 need to be taken off, and then the liquid supply device is connected with the liquid supply end socket 11 to inject the transparent medium liquid 22. After an injection of the transparent medium liquid 22 is completed, the liquid supply end socket 11 and the venting end socket 12 are sealed by the two plugs 3, so that the liquid carrying cavity 210 is completely closed.

Furthermore, the two plugs 3 comprise studs 30. Screw holes 110 are respectively defined on the liquid supply end socket 11 and the venting end socket 12. Each of the studs 30 is screwed with a corresponding screw hole 110. By forwardly or reversely rotating the plugs 3, the studs 30 seal or open the liquid supply end socket 11 and the venting end socket 12.

As shown in FIGS. 5-9, a transparent plate 13 is mounted on the housing 1. A position of the transparent plate 13 corresponds to a camera of the mobile terminal. By such design, the camera of the mobile terminal is allowed to take pictures through the transparent plate 13, which together with the touch portion 2 facilitates the user to fully use the functions of the mobile terminal.

Figure 9:
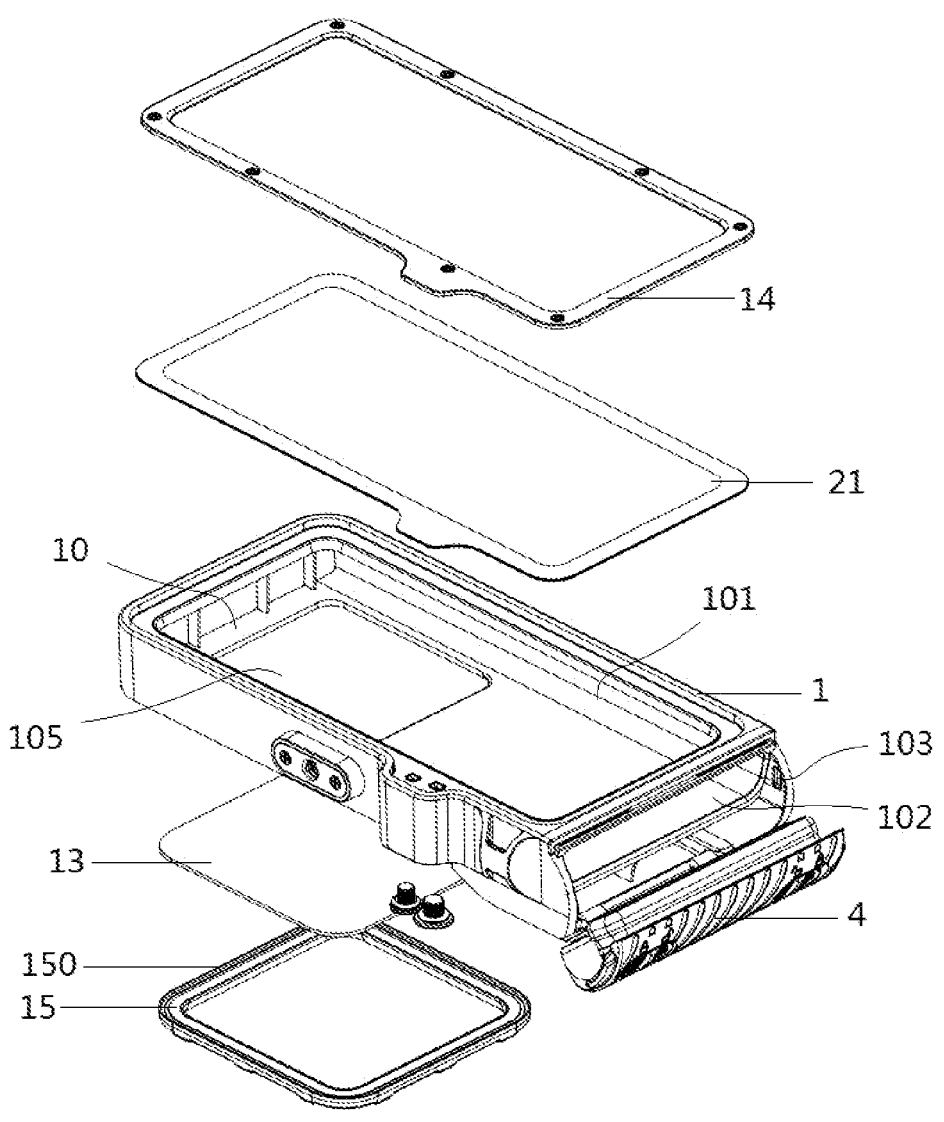
FIG. 9 is another exploded schematic diagram of the waterproof protective case of the present disclosure.
Figure 10:
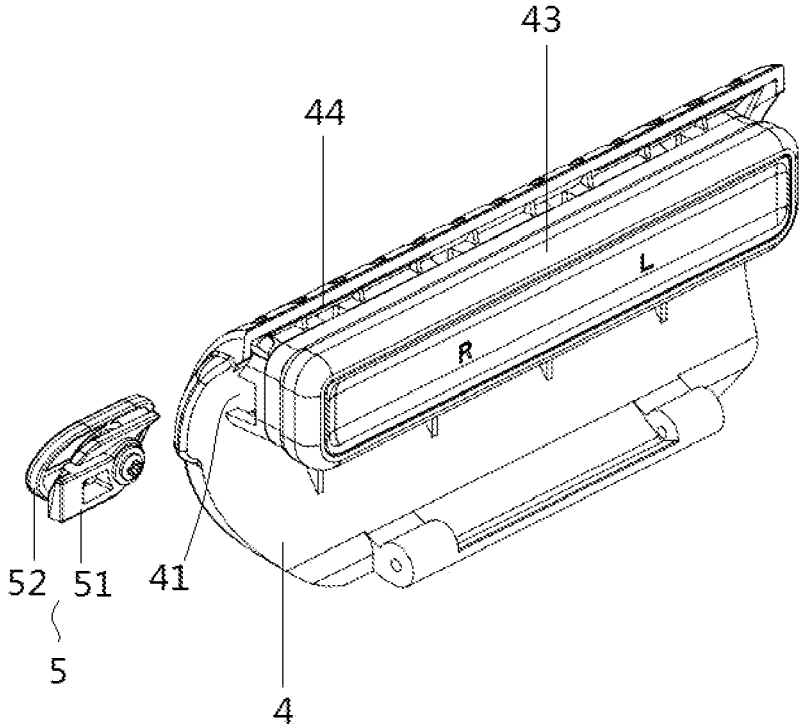
FIG. 10 is a schematic diagram of a flip cover of the present disclosure.
Figure 11:
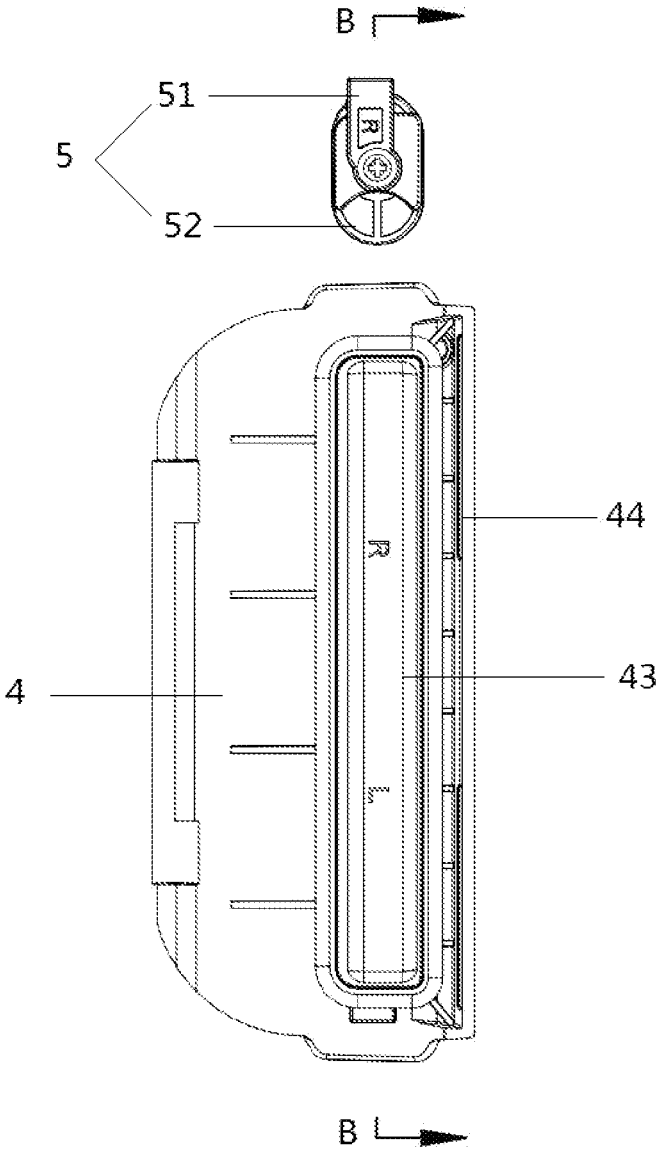
FIG. 11 is a front schematic diagram of the flip cover shown in FIG. 10.
Figure 12:
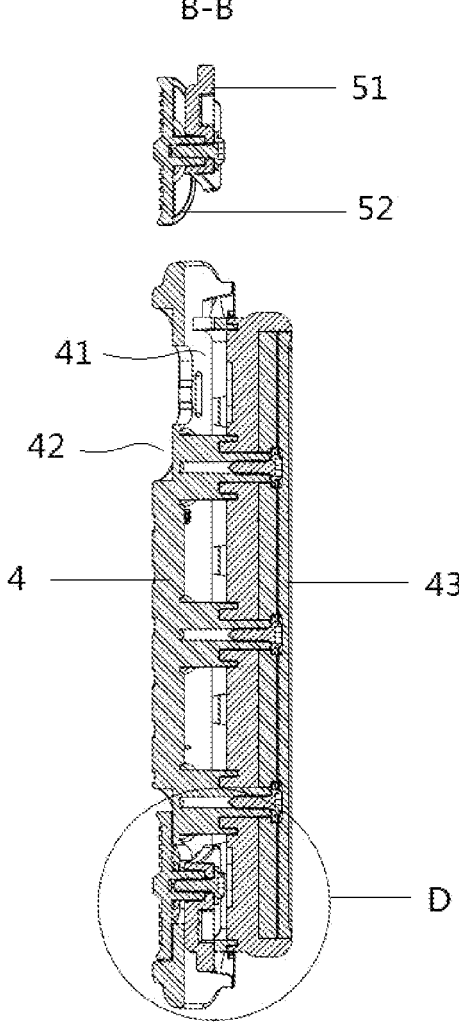
FIG. 12 is a cross-sectional schematic diagram of the flip cover taken along a line B-B shown in FIG. 11.
Figure 13:
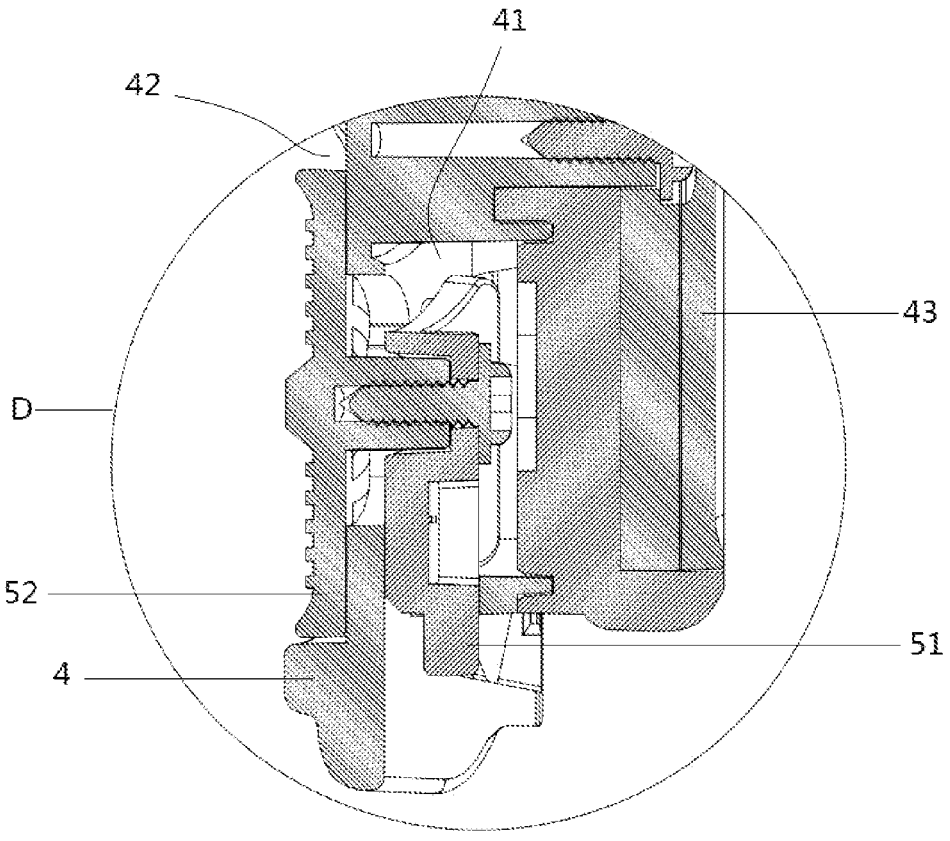
FIG. 13 is an enlarged schematic diagram of portion D shown in FIG. 12.
Figure 14:
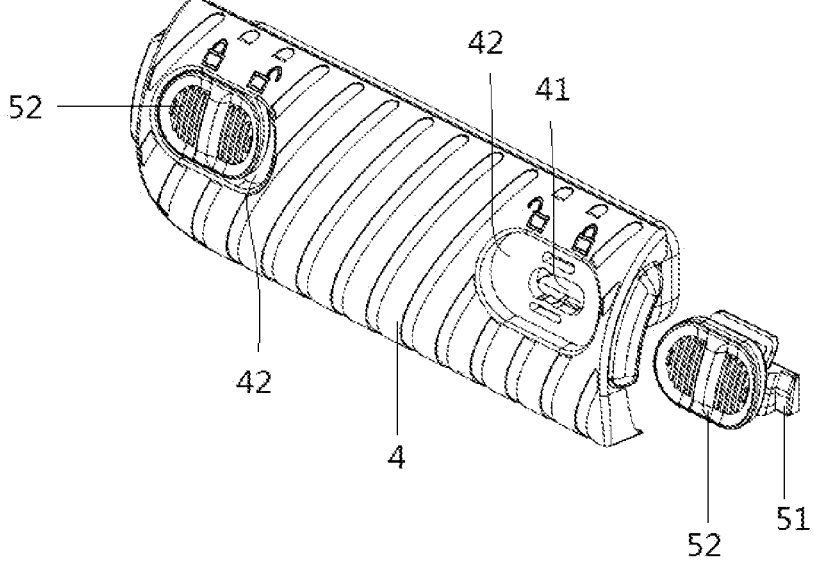
FIG. 14 is another schematic diagram of the flip cover of the present disclosure.
Figure 15:
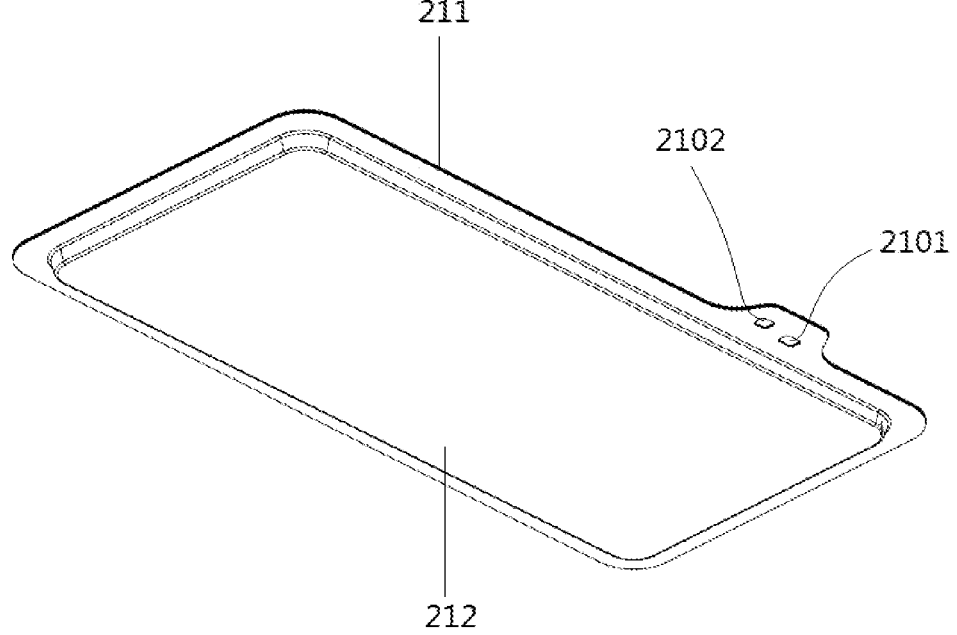
FIG. 15 is a schematic diagram of a flexible bag of the present disclosure.

As shown in FIGS. 7-9, an abutting frame 15 is disposed on the housing 1. A mounting opening 105 is defined on a second sidewall of the accommodating cavity 10. The abutting frame 15 is fixed to the housing 1 through the glue or the screws to abut the transparent plate 13 against the mounting opening. By such design, early-stage assembly, later replacement, and maintenance of the transparent plate 13 are facilitated, and disassembly and assembly convenience is improved.

Furthermore, a sealing strip 150 is disposed at a connecting position of the abutting frame 15 and the housing 1. The sealing strip 150 ensures a tight mounting of the abutting frame 15, thereby ensuring sealing performance of the accommodating cavity 10 and preventing the water from entering the accommodating cavity 10 from the transparent plate 13.

As shown in FIG. 1, a connecting base 16 is disposed on the housing 1, and the connecting base 16 comprises a connecting hole 160 configured to connect with a universal tripod (not shown in the drawings. The connecting base 16 facilitates the user to fix the mobile terminal on the universal tripod and further improves practicality of the waterproof protective case.

As shown in FIGS. 1 and 5, the housing 1 further comprises a hanging seat 17, and the hanging seat 17 defines a hanging hole 170 configured to connect with a hanging strap (not shown in the drawings). The hanging seat 17 facilitates the user to carry the mobile terminal, so as to improve the inletability of the waterproof protective case.

As shown in FIGS. 1, 5, and 9, in order to facilitate the user to place the mobile terminal, the waterproof protective case further comprises a flip cover 4. The housing 1 further defines a accommodating opening 102 communicated with the accommodating cavity. The flip cover 4 is rotatably connected with the housing 1 to cover or open the accommodating opening 102.

Specifically, when in use, flip cover 4 is rotated to pen the accommodating opening 102, then the mobile terminal is placed into the accommodating cavity 10 through the accommodating opening 102, and the display screen of the mobile terminal abuts against the flexible bag 21. After the mobile terminal is placed, the flip cover 4 is rotated to cover the accommodating opening 102, and the mobile terminal is accommodated in the accommodating cavity 10.

As shown in FIGS. 5-6 and 10-13, in order to enable the flip cover 4 to stably cover the accommodating opening 102, the waterproof protective case further comprises locking pieces 5. Clamping holes 103 are defined on the accommodating opening 102 of the housing 1. A sliding groove 41 is defined in the flip cover 4. Each of the locking pieces 5 comprises a clamping block 51. Each clamping block 51 is slidably mounted in the sliding groove 41 and is slidable in and out of the sliding groove 41 to separate from a corresponding clamping hole 103 or to clamp in corresponding clamping hole 103.

Specifically, when the flip cover 4 is rotated to cover the accommodating opening 102, the sliding groove 41 disposed on the flip cover 4 is aligned with the clamping holes 103, then each clamping block 51 slides out of the sliding groove 41 and is clamped in the corresponding clamping hole 103 to lock the flip cover 4 on the housing 1. When each clamping block 51 slides into the sliding groove 41 and the each clamping block 51 is separated from the corresponding clamping hole 103, so that the flip cover 4 is unlocked. At this time, the flip cover 4 is allowed to rotate around the housing 1 to open the accommodating opening 102.

It should be noted that in addition to using the locking pieces 5 to fix the flip cover 4, other methods may also be adopted. For example, magnetic components (not shown in the drawings) or screw components (not shown in the drawings) may be disposed on the flip cover 4 and the housing 1, so as to fix the flip cover 4 to the accommodating opening 102 of the housing 1 through magnetic attraction and screw connection. Since various methods may be adopted, the present disclosure is not limited thereto.

As shown in FIGS. 10-14, to facilitate movement of each clamping blocks 54, each of the locking pieces 5 comprises a shifting block 52. The flip cover 4 defines a limiting opening 42 communicated with the sliding groove 41. Each shifting block 52 is movably disposed at the limiting opening 42 and is connected with a corresponding clamping block 51.

Specifically, when in use, each shifting block 52 is moved along the limiting opening 42 to drive the corresponding clamping block 51 to slide into or out the sliding groove 41, thereby making each clamping block 51 to separate from or clamp in the corresponding clamping hole 103.

Further, each clamping block 51 may have an interference fit with the slide groove 41, so that each clamping block 51 is stably clamped in the corresponding clamping block 103 without external force, thereby improving stability of use. Further, each shifting block 52 may be fixedly connected with the corresponding clamping block 51 through a screw, which facilitates the mounting of ach shifting block 52 and the each clamping block 51 on the flip cover 4.

As shown in FIGS. 5-6 and 10-11, a limiting bar 44 is disposed on the flip cover 4. A limiting groove 104 is define on the accommodating opening 102 of the housing 1. The limiting bar 44 is clamped in the limiting groove 104

Specifically, when the flip cover 4 is rotated to close the accommodating opening 102, the limiting bar 44 disposed on the flip cover 4 snaps into the limiting groove 104, so that the flip cover 4 fits the housing 1 stably, thereby further improving mounting stability of the flip cover 4.

As shown in FIGS. 1-2, 10, and 14, anti-slip lines are define on the housing 1, the flip cover 4, and each shifting block 52. The anti-slip lines define on the housing 1 and the flip cover 4 increase friction, so that the user is allowed to hold the waterproof protective case underwater. The anti-slip lines define on each shifting block 52 facilitate the user to move each shifting block 52 and improves operational flexibility.

As shown in FIGS. 1-8, the waterproof protective case further comprises a holder 6. The flip cover 4 further comprises a pressing block 43. The holder 6 is configured to hold the mobile terminal. The holder 6 is placeable in the accommodating cavity 10 through the accommodating opening 102. The pressing block 43 abuts against the holder 6 in the accommodating cavity 10 as the flip cover 4 rotates.

Specifically, when in use, the holder 6 is accommodated in the accommodated cavity 10, the flip cover 4 is rotated to close the accommodating opening 102. At this time, the pressing block 43 abuts against the holder 6, which prevents the holder 6 from shaking in the accommodating cavity 10 and improves placement stability of the holder 6. When the flip cover 4 is rotated to open the accommodating opening 102, the pressing block 43 is driven away from the accommodating cavity 10 and is disconnected with the holder 6. At this time, the holder 6 in the accommodation cavity 10 is allowed to taken out through the accommodating opening 102.

It should be noted that the mobile terminal is an electronic device, such as a mobile phone, a tablet, or a camera, and the holder 6 and the accommodating cavity 10 are designed to be adaptable to the electronic device.

Optionally, suction cups 60 configured to suck the mobile terminal are disposed on the holder 6, so that the mobile terminal accommodated is stably fixed on the holder 6, thereby preventing the mobile terminal from shaking in the accommodation cavity 10.

It is understood that although the embodiments of the present disclosure have been shown and described, those of ordinary skill in the art can understand that various changes, modifications, substitutions, and variations can be made to these embodiments without departing from the principle and spirit of the present disclosure.

What is claimed is:

1. A waterproof protective case of a mobile terminal for diving, comprising:
   a housing, and
   a touch portion;
   wherein the housing defines an accommodating cavity therein; the accommodating cavity is configured to accommodate the mobile terminal; and a fixing opening is defined on a first sidewall of the accommodating cavity; the fixing opening is configured to communicate with an outside;
   wherein the touch portion is disposed on the fixing opening; the touch portion comprises a flexible bag and a transparent medium liquid; a liquid carrying cavity configured to store the transparent medium liquid is defined in the flexible bag; a first surface of the flexible bag faces the outside; a second surface of the flexible bag abuts against a display screen of the mobile terminal;

wherein the housing further comprises a pressing frame fixed to the housing through a glue or screws so as to press the flexible bag at the fixing opening;
   wherein the waterproof protective case further comprises a flip cover; the housing further defines an accommodating opening in communication with the accommodating cavity; wherein the flip cover is rotatably connected with the housing to close or open the accommodating opening; wherein the mobile terminal is allowed to be accommodated in or taken out of the accommodating cavity through the accommodating opening;
   wherein the waterproof protective case further comprises at least one locking piece; wherein at least one clamping hole is defined at the accommodating opening of housing; wherein there is defined a sliding groove in the flip cover; wherein each of the at least one locking piece comprises a clamping block; each clamping block is slidably mounted in the sliding groove and is slidable in and out of the sliding groove; wherein when the flip cover is rotated to close the accommodating opening, each clamping block slides out of the sliding groove and is clamped in a corresponding clamping hole to lock the flip cover.

2. The waterproof protective case according to claim 1, wherein The flexible bag comprises a top film layer and a bottom film layer; edges of the top film layer are connected with edges of the bottom film layer are connected, and the top film layer and the bottom film layer are enclosed to define the liquid carrying cavity; the top film layer faces the outside, and the bottom film layer abuts against the display screen of the mobile terminal.

3. The waterproof protective case according to claim 2, wherein the top film layer is made of a thermoplastic polyurethanes (TPU) material or a polyvinyl chloride (PVC) material; the bottom film layer is made of a Polycarbonate (PC) material or a polyethyleneterephthalate (PET) material; the transparent medium liquid is dimethyl silicone oil, polyethylene glycol, or transparent butter.

4. The waterproof protective case according to claim 2, wherein a liquid supply end socket is disposed on the housing; a liquid filling inlet communicated with the liquid carrying cavity is defined on the flexible bag; the liquid supply end socket is communicated with the liquid filling inlet.

5. The waterproof protective case according to claim 4, wherein a venting end socket is disposed on the housing; an air vent communicated with the liquid carrying cavity is defined on the flexible bag; the venting end socket is communicated with the air vent.

6. The waterproof protective case according to claim 5, wherein the waterproof protective case further comprises two plugs; the two plugs are respectively detachably mounted on the liquid supply end socket and the venting end socket to seal or open the liquid supply end socket and the venting end socket.

7. The waterproof protective case according to claim 6, wherein the two plugs comprises studs; wherein screw holes are respectively defined in the liquid supply end socket and the venting end socket, wherein each of the studs is screwed with a corresponding screw hole, so as to seal or open the liquid supply end socket and the venting end socket.

8. The waterproof protective case according to claim 1, wherein a transparent plate is mounted on the housing; a position of the transparent plate corresponds to a camera of the mobile terminal.

9. The waterproof protective case according to claim 1, wherein the waterproof protective case further comprises a holder; the flip cover further comprises a pressing block; the holder is configured to hold the mobile terminal; the holder is placeable in the accommodating cavity through the accommodating opening; when the flip cover is rotated to close the accommodating opening, the pressing block abuts against the holder accommodated in the accommodating cavity.

10. The waterproof protective case according to claim 9, further comprising a plurality of suction cups configured to suck the mobile terminal that are disposed on the holder in order to improve stability of the mobile terminal accommodated in the accommodating cavity.

11. The waterproof protective case according to claim 1, wherein there is disposed a limiting bar on the flip cover, and there is defined a limiting groove at the accommodating opening of the housing; wherein the limiting bar is configured to clamped in the limiting groove thus improving a sealing performance of the flip cover and the housing.

12. The waterproof protective case according to claim 1, wherein each of the at least one locking piece comprises a shifting block, wherein the flip cover defines a limiting opening in communication with the sliding groove, wherein each shifting block is movably disposed at the limiting opening and is connected with a corresponding clamping block; wherein each shifting block is movable along the limiting opening to drive the corresponding clamping block to slide into or out of the sliding groove.

13. The waterproof protective case according to claim 12, wherein anti-slip lines are disposed on the housing, the flip cover, and each shifting block so that a user is allowed to hold the waterproof protective case and move each shifting block conveniently.

14. The waterproof protective case according to claim 1, wherein the housing further comprises a hanging seat, in which there is defined a hanging hole configured to connect with a hanging strap.

15. The waterproof protective case according to claim 1, wherein there is disposed an abutting frame on the housing, wherein there is defined a mounting opening in a second sidewall of the accommodating cavity, wherein the abutting frame is fixed to the housing through the glue or screws to abut the transparent plate against the mounting opening.

\* \* \* \* \*